United States Patent Office 2,830,967
Patented Apr. 15, 1958

2,830,967

PROCESS FOR POLYMERIZING POLYORGANO-SILOXANES WITH PHOSPHORUS-NITROGEN COMPOUNDS

Siegfried Nitzsche and Manfred H. Wick, Burghausen, Upper Bavaria, Germany, assignors to Wacker Chemie G. m. b. H., Munich, Bavaria, Germany No Drawing. Application December 23, 1953
Serial No. 400,111

Claims priority, application Germany January 13, 1953

10 Claims. (Cl. 260—46.5)

The present invention relates to a method for polymerizing liquid organosiloxanes by the use of certain phosphorus-nitrogen compounds as polymerization catalysts.

High molecular weight liquid or gel siloxanes, especially dimethylpolysiloxanes, which are starting materials in the production of silicone rubber, are prepared either by condensing low molecular weight hydroxylated dimethylsilicone oils with so-called condensation catalysts or by polymerizing cyclic dimethylsiloxanes with rearrangement catalysts. The rearrangement catalysts split the Si—O linkage and effect a rearrangement to linear high molecular weight siloxanes.

Experiments have shown that pure condensation reactions, i. e. those using only condensation catalysts, do not produce a sufficiently high degree of polymerization; thus a good catalyst must simultaneously catalyze the rearrangement. However, at elevated temperatures, rearrangement catalysts often have a depolymerizing effect. Therefore after polymerization they usually must be completely removed from the system so that the heat stability of the resultant products does not suffer. Experimental results show further that the type of polymerization catalyst and the manner of its use exercise a great effect on the properties of the silicone rubber obtained from the polymer. When unsuitable catalysts are used, for example, the incorporation of fillers in the polymer can be much more difficult due to cross linking, or when molding the products, too much "cold flow" can occur.

A number of methods for converting low molecular weight organosiloxanes into high molecular weight materials are known to the art. The catalysts heretofore used for this purpose, however, have a number of disadvantages. For example, sulfuric acid and chlorosulfonic acid dissolve with difficulty in low molecular weight siloxanes and as a result of too rapid action, easily lead to non-uniform polymers. A number of catalysts, such as boric acid and its esters, boron fluoride, phosphorus pentoxide, phosphoric acid, phosphorus trichloride, and phosphorus pentachloride, are good polymerization agents but the mixtures prepared from polymers so produced have too much cold flow when the materials are vulcanized under pressure. Compounds such as sulfuryl chloride and antimony chloride produce non-uniform highly colored polymers. Ferric chloride has the disadvantage that after polymerization it must be carefully washed out of the polymer and also is suspected of causing an undue amount of organic group cleavage. Alkali hydroxides, alkali salts of silanols or siloxanes, and alkali alcoholates are successful only when used very carefully since alkalis easily split the Si—C linkage and thereby cause undesirable cross linking of the resulting polymers. The alkali polymerized siloxanes also often wet fillers very poorly, a great disadvantage when the polymer is to be used in the preparation of silicone rubber. Phenoxyphosphoric acid dichloride and phenylphosphoric acid dichloride are also good polymerization catalysts, but have the disadvantages of instability at elevated temperatures, instability toward water, and a tendency to depolymerize the product.

It is an object of this invention to provide a method of polymerizing organosiloxanes by means of a catalyst which has none of the inherent disadvantages of the formerly known catalysts.

In accordance with the present invention, it has been found that liquid organosiloxanes can easily be converted, by means of a new group of phosphorus-nitrogen catalysts, into high molecular weight liquid or gel siloxanes which do not have the disadvantages brought about by the catalysts which have been used in the past. The polymerization catalysts employed in this invention can be used merely to increase the viscosity of the liquid organosiloxane. The greatest benefits to be obtained from the invention, however, are found when the polymerized organosiloxane is employed for the production of silicone rubber. The production of such silicone rubber is well-known to the art and need not be fully described here. In brief, however, the silicone rubbers are ordinarily prepared by mixing the organosiloxane polymer with an inorganic filler, preferably a silica filler, and then vulcanizing the compounded mixture. The vulcanization is usually carried out with an aromatic acyl peroxide such as benzoyl peroxide or t-butyl perbenzoate as a vulcanization catalyst.

The polymerization agents of the present invention are phospho-nitrile halides or certain organo nitrogen derivatives of phosphorous or phosphoric acid. The phosphonitrile halides employed are preferably the polymeric chlorides represented by the formula $(PNCl_2)_n$ wherein $n$ is an integer of at least 3. The most preferred compounds of this type are those in which $n$ is 3 to 6 and the commercially available material is usually a mixture of such polymers.

The organo nitrogen derivatives of phosphorous or phosphoric acid employed herein are represented by compounds of the formulae

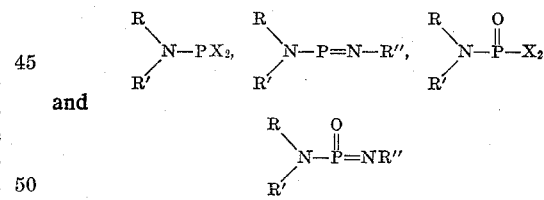

and

In these formulae R and R' are substituents selected from the group consisting of aryl, alkyl, alkaryl, and aralkyl radicals and hydrogen, at least 1 of the substituents R and R' being one of the defined organic radicals. R" is an alkyl, aryl, alkaryl, or aralkyl radical, and X is a halogen atom, preferably chlorine or bromine.

The following compounds are representative of the preferred organic phosphorus-nitrogen compounds.

Phosphorous acid-dichloride-anilide
$C_6H_5—NH—PCl_2$

Phosphorous acid-dichloride-methyl-anilide
$C_6H_5—N(CH_3)—PCl_2$

Phosphorous acid-dichloride-ethyl-anilide
$C_6H_5—N(C_2H_5)—PCl_2$

Phosphorous acid-dichloride-diphenylamide
$(C_6H_5)_2N—PCl_2$

Phosphorous acid-dichloride-methylamide
$CH_3—NH—PCl_2$

Phosphorous acid-dichloride-isopropylamide
$(CH_3)_2CH—NH—PCl_2$

Phosphorous acid-dichloride-benzylamide $C_6H_5—CH_2—NH—PCl_2$

Phosphorous acid-anilide-anile $[C_6H_5N=P—NH—C_6H_5]_2$

Phosphorous acid-methylamide-anile $C_6H_5—N=P—NH—CH_3$

Phosphoric acid-dichloride-anilide $C_6H_5—NH—POCl_2$

Phosphoric acid-dichloride-α-naphthylamide $C_{10}H_7NH—POCl_2$

Phosphoric acid-dichloride-methylamide $CH_3NH—POCl_2$

Phosphoric acid-dichloride-isopropylamide $(CH_3)_2CHNH—POCl_2$

Phosphoric acid-dichloride-ethylamide $C_2H_5NH—POCl_2$

Phosphoric acid-anilide-anile $$C_6H_5NH—\underset{\underset{O}{\|}}{P}=NC_6H_5$$

Phosphoric acid-α-naphthylamide-anile $$C_{10}H_7NH—\underset{\underset{O}{\|}}{P}=NC_6H_5$$

Phosphoric acid-methylamide-anile $$CH_3NH—\underset{\underset{O}{\|}}{P}=NC_6H_5$$

Phosphoric acid-isopropylamide-anile $$(CH_3)_2CHNH—\underset{\underset{O}{\|}}{P}=NC_6H_5$$

The above defined polymerization agents work on all types of liquid organosiloxanes. They are used to special advantage on those siloxanes which polymerize to high molecular weight linear liquid products or gel products such as are usually used in the production of silicone rubber. Such siloxanes are usually composed mainly of diorganosiloxane units, although they can also contain siloxane units of the general formula $RSiO_{1.5}$ or $R_3SiO_{.5}$ wherein R is any desired organic radical. In general the siloxanes to be polymerized have a degree of substitution of from 1.9 to 2.1, in other words they have an average of from 1.9 to 2.1 organic groups attached to silicon per silicon atom.

The silicon bonded organic radicals in the organosiloxane to be polymerized can be any alkyl radical, e. g. methyl, ethyl, propyl, butyl, or octadecyl radical, any aryl radical such as phenyl, tolyl, or xylyl radicals, aralkyl or alkaryl radicals, halogenated alkyl or aryl radicals, or aryl radicals, or trimethylsilmethylene radicals $[(CH_3)_3SiCH_2—]$. The siloxanes to be polymerized can have one, two, or three of the same or different organic radicals attached to each silicon atom, as long as the average degree of substitution is from 1.9 to 2.1. Preferably most of the polymeric units present are diorganosiloxane units. The siloxanes can be either homopolymers or copolymers, and can be of either cyclic, linear, or partially cross linked structure. The starting siloxanes can be of either low or comparatively high molecular weight. In the latter case the degree of polymerization is merely advanced even further by the use of the defined catalysts.

Although this invention is applicable to all liquid organosiloxane materials, its greatest commercial importance is in connection with organosiloxane polymers wherein all of the organic groups are methyl radicals or where both methyl and phenyl radicals are present.

The new polymerization catalysts employed in this invention act both to condense and to rearrange the organosiloxane polymers. The catalysts have some effect regardless of the amount employed. For practical purposes, however, it is preferred that the catalysts be employed in an amount of from 0.05 percent to 10 percent by weight based on the weight of the organosiloxane. Best results are obtained by using from about 0.1 to 1 percent by weight of these catalysts. The catalysts can be added to the organosiloxane either in the form of a solution in an organic solvent or in an undiluted condition. The polymerization takes place even at room temperature and below. For practical commercial operation, however, it is preferable to accelerate the polymerization by heating the mixture of siloxane and catalyst at temperatures of from about 120° to 180° C., with best results being obtained at about 150° C.

There are a number of advantages obtained in the use of the defined catalysts. The catalysts are easily dispersed in the organosiloxanes, therefore polymerization is uniform and easily controllable. The polymerization takes place rapidly even at room temperature. The catalysts do not cleave carbon to silicon linkages even at elevated temperature and hence no undesirable cross linking takes place. The catalysts do not need to be removed from the system after polymerization, since they have no depolymerizing effect and seem to be inactivated by vulcanization. In the preparation of silicone rubber, polymers prepared in accordance herewith show no cold flow and have a good absorption and wetting ability for fillers. Products obtained in accordance with this invention show enhanced heat stability due to the antioxidant nature of the phosphorus-nitrogen compounds.

The following examples are illustrative only.

*Example 1*

A dimethylsilicone oil having a viscosity of 500 cs. was prepared in the usual manner by hydrolyzing very pure dimethyldichlorosilane. To 100 g. of this oil was added 0.1 g. $(PNCl_2)_4$ dissolved in 5 cc. of trichloroethylene. The mixture was agitated and heated at 120° C. until the mass became so viscous that further stirring was impossible. After cooling, there was obtained a soft rubbery polymer. 100 g. of this polymer, 150 g. $TiO_2$, and 2.5 g. benzoyl peroxide were kneaded in a Banbury mixer. The resultant mass was rolled out into a sheet on a rolling mill, vulcanized for 10 minutes at 125° C. in a vulcanization press, and finally heated for 10 hours at 150° C. and 10 hours at 200° C. There was obtained a silicone rubber with a Shore hardness of 55 and a tensile strength of 30 kg./cm.² at an elongation of 100 percent.

*Example 2*

To 100 g. of a dimethylsiloxane having a viscosity of 100,000 cs. was added a solution of 0.5 g. of phosphorous acid-anilide-anile in 5 cc. of toluene. The mixture was heated to 150° C. for 24 hours. This produced an elastomeric silicone gel which was very suitable for further working up into a silicone rubber.

*Example 3*

100 g. of a dimethylsiloxane having a viscosity of 500 cs. and 0.5 g. phosphorous acid-dichloride-anilide in 4 cc. chloroform were mixed and allowed to stand at room temperature for 20 days. An elastomeric silicone gel was formed. This gel was blended with 80 g. $SiO_2$ and 4 g. t-butylperbenzoate, molded in a vulcanization press for 15 minutes at 150° C., and finally cured 4 hours at 250° C. The silicone rubber obtained had a Shore hardness of 60 and a tensile strength of 45 kg./cm.² at an elongation of 130 percent.

*Example 4*

A mixture of 100 g. of the dimethylsiloxane of Example 1 and 1 g. of phosphoric acid-dichloride-anilide was prepared at 100° C. and the mixture agitated at 120° C. In 2 hours there was obtained a polymer suitable for the production of silicone rubber.

*Example 5*

A mixture of 100 g. of the dimethylsiloxane of Example 1 and 0.2 g. phosphoric acid-anilide-anile in 10 cc. alcohol was heated to 150° C. until upon cooling a viscous polymer was obtained. The silicone rubber prepared by the usual methods from this polymer had excellent physical properties.

Example 6

A methylphenylsiloxane oil having a viscosity of 1,000 cs. was prepared by the hydrolysis of methylphenyldichlorosilane. This oil was mixed with 0.3 percent by weight of phosphorous acid-dichloride-ethylanilide and agitated at 130° C. for 5 hours. After cooling there was obtained a viscous polymer which, when worked up with fillers and peroxides, gave a silicone rubber with excellent physical properties.

Example 7

Similar to the dimethylsiloxane and methylphenylsiloxane polymers in the preceding examples, ethylmethyl-, dibutyl-, diphenyl-, trimethylsilmethylenemethyl- and methylchlorophenyl-siloxane and copolymers of such siloxanes were converted, by means of the catalysts described in Examples 1 to 6, into high molecular weight fluids or gels which were eminently suitable for the preparation of silicone rubber.

That which is claimed is:

1. The method of polymerizing a liquid organosiloxane having an average degree of substitution of from 1.9 to 2.1 organic groups attached to silicon by C—Si linkage per silicon atom comprising contacting the siloxane with a phosphorus-nitrogen compound selected from the group consisting of compounds of the general formulae:

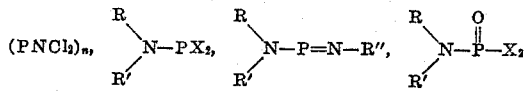

and

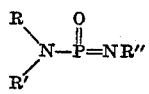

where $n$ is an integer of at least 3, R and R' are selected from the group consisting of aryl, alkyl, alkaryl, and aralkyl radicals and hydrogen, at least 1 of the substituents R and R' being one of the defined organic radicals, R'' is a substituent selected from the group consisting of alkyl, aryl, alkaryl, and aralkyl radicals, and X is a halogen atom, until an increase in viscosity of said organosiloxane is obtained 2. The method of claim 1 wherein the organic groups attached to silicon in the organosiloxane are selected from the group consisting of alkyl and aryl radicals.

3. The method of claim 1 wherein the organic groups attached to silicon in the organosiloxane are all methyl radicals.

4. The method of claim 1 wherein the organic radicals attached to silicon in the organosiloxane are methyl and phenyl radicals.

5. The method of polymerizing a liquid organosiloxane having an average degree of substitution of from 1.9 to 2.1 organic radicals attached to silicon by C—Si linkage per silicon atom comprising mixing the said organosiloxane with from 0.1 to 1 percent by weight, based on the weight of the organosiloxane, of a phosphorus-nitrogen compound selected from the group consisting of compounds of the formulae:

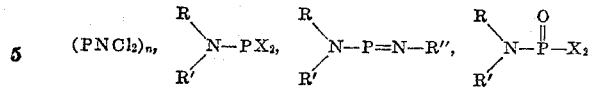

and

where $n$ is an integer of at least 3, X is a halogen atom, R and R' are substituents selected from the group consisting of alkyl, aryl, alkaryl, and aralkyl radicals and hydrogen, at least 1 of the substituents R and R' being one of the defined organic radicals, and R'' is a substituent selected from the group consisting of alkyl, aryl, alkaryl, and aralkyl radicals, and heating the mixture at a temperature of from 120° to 180° C. until an increase in viscosity is obtained.

6. The method of claim 5 wherein the organic groups attached to silicon in the organosiloxane are selected from the group consisting of alkyl and aryl radicals.

7. The method of claim 5 wherein the organic groups attached to silicon in the organosiloxane are all methyl radicals.

8. The method of claim 5 wherein the organic radicals attached to silicon in the organosiloxane are methyl and phenyl radicals.

9. The method of polymerizing a liquid dimethylsiloxane to a higher molecular weight suitable for the production of silicone rubber comprising contacting the dimethylsiloxane with a phosphorus-nitrogen compound selected from the group consisting of compounds of the general formulae:

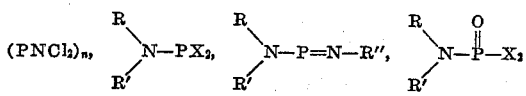

and

where $n$ is an integer of at least 3, R and R' are selected from the group consisting of aryl, alkyl, alkaryl, and aralkyl radicals and hydrogen, at least 1 of the substituents R and R' being one of the defined organic radicals, R'' is a substituent selected from the group consisting of alkyl, aryl, alkaryl, and aralkyl radicals, and X is a halogen atom, until an increase in viscosity of said organosiloxane is obtained.

10. The method of polymerizing a liquid organosiloxane having an average degree of substitution of from 1.9 to 2.1 organic radicals attached to silicon by C—Si linkage per silicon atom, said organic radicals being selected from the group consisting of alkyl and aryl radicals, comprising contacting said organosiloxane with from 0.1 to 1 percent by weight, based on the weight of the organosiloxane, of a compound having the formula $(PNCl_2)_n$, where $n$ is an integer of from 3 to 6 inclusive, until an increase in viscosity of said organosiloxane is obtained.

No references cited.